(12) United States Patent
Moyes (10) Patent No.: US 6,689,301 B1
(45) Date of Patent: *Feb. 10, 2004

(54) METHOD OF MANUFACTURING A MOLDED DOOR SKIN FROM A WOOD COMPOSITE, DOOR SKIN PRODUCED THEREFROM, AND DOOR MANUFACTURED THEREWITH

(75) Inventor: Hartley Moyes, Linton (GB)

(73) Assignee: MDF, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/604,122

(22) Filed: Jun. 26, 2000

Related U.S. Application Data (60) Continuation of application No. 09/353,053, filed on Jul. 13, 1999, now Pat. No. 6,079,183, which is a division of application No. 08/942,976, filed on Oct. 2, 1997, now Pat. No. 6,073,419.

(30) Foreign Application Priority Data

Apr. 10, 1997 (GB) ................................. 9707318

(51) Int. Cl.⁷ ............................................... B29C 53/84
(52) U.S. Cl. ........................................................ 264/322
(58) Field of Search .......................... 52/745.19, 784.1, 52/455; 264/322, 102, 320, 319, 119; 156/196

(56) References Cited

U.S. PATENT DOCUMENTS

| | | |
|---|---|---|
| 3,112,243 A | 11/1963 | Egerstrand |
| 3,900,334 A * | 8/1975 | Brink ........................ 264/124 |
| 4,007,076 A | 2/1977 | Clarke et al. |
| 4,146,662 A | 3/1979 | Eggers et al. |
| 4,201,802 A | 5/1980 | Vande Kieft |
| 4,236,365 A | 12/1980 | Wheeler |
| 4,265,067 A | 5/1981 | Palmer |
| 4,301,187 A | 11/1981 | Burch |

(List continued on next page.)

FOREIGN PATENT DOCUMENTS

| | | |
|---|---|---|
| EP | 0420831 | 4/1991 |
| EP | 0688639 | 12/1995 |
| GB | 454073 | 9/1936 |
| GB | 1154241 | 6/1969 |
| GB | 1420244 | 1/1976 |
| GB | 2237531 | 5/1991 |
| GB | 2276902 | 10/1994 |
| GB | 2306541 | 5/1997 |
| GB | 2324061 | 10/1998 |
| JP | 54-093077 A | 7/1979 |
| JP | 55-042804 | 3/1980 |
| JP | 57-049550 | 3/1982 |
| JP | 58-024433 | 2/1983 |
| JP | 62-264916 | 11/1987 |
| JP | 03-284912 | 12/1991 |
| WO | WO8702407 | 4/1987 |
| WO | WO 87/05955 | 10/1987 |
| WO | WO 96/03262 | 2/1996 |

OTHER PUBLICATIONS

PCT International Search Report, PCT/US98/07003.

*Primary Examiner*—Michael Safavi
(74) *Attorney, Agent, or Firm*—Liniak, Berenato & White, LLC (57) ABSTRACT

A method of manufacturing a door skin includes the steps of providing a wood composite flat blank. The blank is placed between the platens of a heated press, the platens being heated to a temperature sufficient to soften the resins in the blank and to thereby soften the blank. Sufficient pressure is applied to close the platens and thereafter the pressure is cyclically applied to increased pressure levels for thereby causing the blank to be deformed into a molded shape determined by the configuration of the platens. The molded blank is then removed from between the platens.

52 Claims, 3 Drawing Sheets

U.S. PATENT DOCUMENTS

| | | |
|---|---|---|
| 4,517,147 A | 5/1985 | Taylor et al. |
| 4,606,388 A | 8/1986 | Favot |
| 4,684,489 A | 8/1987 | Walter |
| 4,828,004 A | 5/1989 | Martinez et al. |
| 4,830,929 A | 5/1989 | Ikeda et al. |
| 4,844,968 A | 7/1989 | Persson et al. |
| 5,000,673 A | 3/1991 | Bach et al. |
| 5,008,057 A | 4/1991 | Risius et al. |
| 5,085,891 A | 2/1992 | Evans |
| 5,183,622 A | 2/1993 | Persson |
| 5,219,634 A | 6/1993 | Aufderhaar |
| 5,306,539 A | 4/1994 | Clarke et al. |
| 5,505,772 A | 4/1996 | Charazipour et al. |
| 5,782,055 A | 7/1998 | Crittenden |
| 6,079,183 A * | 6/2000 | Moyes ............... 52/784.1 |
| 6,500,372 B1 * | 12/2002 | Frankefort et al. ......... 264/102 |

* cited by examiner

METHOD OF MANUFACTURING A MOLDED DOOR SKIN FROM A WOOD COMPOSITE, DOOR SKIN PRODUCED THEREFROM, AND DOOR MANUFACTURED THEREWITH

This application is a continuation of application Ser. No. 09/353,053, filed Jul. 13, 1999, now U.S. Pat. No. 6,079,183, which is a division of application Ser. No. 08/942,976, filed Oct. 2, 1997, now U.S. Pat. No. 6,073,419.

The disclosed invention is to a method for manufacturing a molded door skin from a wood composite material, as well as the resulting skin and the door produced therefrom. More particularly, the disclosed invention is to a method for manufacturing a molded door skin in which a solid blank sheet of wood composite material is heated in a press to a temperature sufficient to soften the blank, after which the press platens are pressure actuated to close and the pressure thereafter cyclically increased to thereby deform the blank into a molded configuration suitable for a door skin and ultimately for being assembled into a door.

Hollow core doors are used in both interior and exterior applications. A hollow core door may be a flush door, that is one flat or planar on both major surfaces. Alternatively, the hollow core door may be a "molded" door, that is one having a series of three dimensional panels formed into the skins as they are being manufactured. Molded door skins are relatively expensive, because the capital cost is quite high due to the need for dies, presses, and the like. The skins used for flush doors, on the other hand, are relatively inexpensive, but they do not provide the aesthetic features sometimes required by consumers.

Many hollow core doors are made from door skins formed from wood composite materials. These wood composite materials may include particle board, flake board, hard board and medium density fiber board ("MDF"). The wood composites utilize a resin binder, which frequently is a thermal setting resin, in order to maintain the wood fibers forming the composite in solid form. The wood composites are not moisture impervious, so doors utilizing such skins may not be suitable for exterior applications. Should the composite material absorb moisture, whether in liquid or gas form, then the door components may swell and the door distort. Fiberglass and steel doors do not have the same moisture absorbing tendency, and hence are more frequently used for exterior applications.

Because of the cost differential between a wood composite flush skin and a wood composite molded skin, attempts have been made to transform flush skins into molded skins. Those prior efforts have not resulted in a commercially acceptable door skin, principally because the appearance of the surface is not satisfactory. Prior efforts to transform a flush skin into a molded skin have generally resulted in a skin having a cracked, marred, or otherwise aesthetically unpleasing configuration and appearance.

Standard molded door skins are formed from a relatively thick mat or bat of material, which is thereafter compressed in a press to a relatively thin thickness. The mat is dry in the case of MDF or has a very high water content in the case of hard board, with the result for the latter that the water is squeezed out during the pressing operation. Because the mat is in a very flexible state during the pressing operation, then the resulting skin has sharply defined features acceptable to consumers because the wood fibers can flow in order to conform to the mold. Due in part to the high capital costs involved to create molded skins, the manufacturer frequently requires that an individual order be for a large number of skins in order to permit maximum operating efficiencies. Smaller orders become cost prohibitive.

Those skilled in the art will recognize that there is a need for a method of manufacturing a molded door skin from a wood composite which permits a standard flush skin blank to be used as the base material, and which results in a molded door skin having the features and surface characteristics acceptable to consumers. Yet a further need in the art is a door manufactured from wood composite door skins, which has suitable resistance to moisture so that the door may be used for exterior applications. The disclosed invention meets these and other needs in the art.

A primary object of the disclosed invention is a method for manufacturing a door skin from a wood composite blank through cyclically applying an ever increasing pressure to a softened blank, so that the resulting skin has the features and surface characteristics acceptable to consumers.

A further object of the invention is a door skin which is impervious to moisture, with the result that the door will not distort and therefore will be suitable for exterior applications.

A method of manufacturing a door skin, according to the invention, comprises the steps of providing a wood composite flat blank. The blank is placed between the platens of a heated press, with the platens being heated to a temperature sufficient to soften the resin in the blank and to thereby soften the blank; Sufficient pressure is applied to close the platens, and thereafter the pressure is cyclically applied at increased levels for thereby causing the blank to be deformed into a molded shape determined by the configuration of the platens. The molded blank is then removed from between the platens.

A door skin, according to the invention, comprises a molded medium density fiber board three dimensional blank. The blank has a first portion with a first pre-selected thickness. The blank has a second portion with a second preselected thickness. The second thickness is less than the first thickness.

A door skin, according to the invention, comprises a molded medium density fiber board three dimensional blank having a density of about 800 to about 1,000 Kg/m$^3$.

A door, according to the invention, comprises a peripheral frame having oppositely disposed sides. First and second molded skins are provided. Each skin has first and second sides. Each first side of each skin has a moisture impervious barrier applied wholly thereabout. Each of the door skin second sides is secured to one of the frame sides.

These and other objects and advantages of the invention will be readily apparent in view of the following description and drawings.

The above and other objects and advantages and novel features of the present invention will become apparent in view of the following detailed description of the preferred embodiment of the invention, illustrated in the accompanying drawings, wherein.

Figure 2:
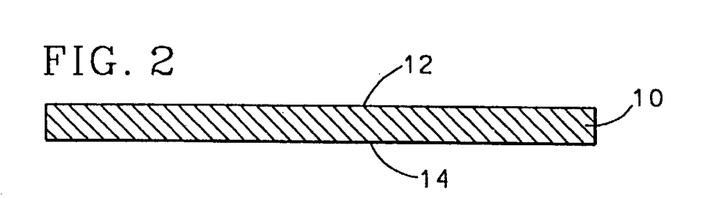
FIG. 2 is a fragmentary cross sectional view of the flat blank used with the invention.

Flush flat wood composite blank 10, as best shown in FIG. 2, has oppositely disposed parallel, planar surfaces 12 and 14. The blank 10 preferably is a wood composite, bound together with thermal setting resins, such as medium density fiber board or hard board. MDF frequently uses urea formaldeyde resin as the binder, which material softens or melts at temperatures of between 320° F. to about 425° F. MDF blanks are available in various thicknesses and weights, ranging from 3 millimeters to 7 millimeters. I prefer that the blank 10 be relatively thick, in order to make available wood fiber material which may stretch during the pressing operation in order to provide sharp, well defined features.

Figure 1:
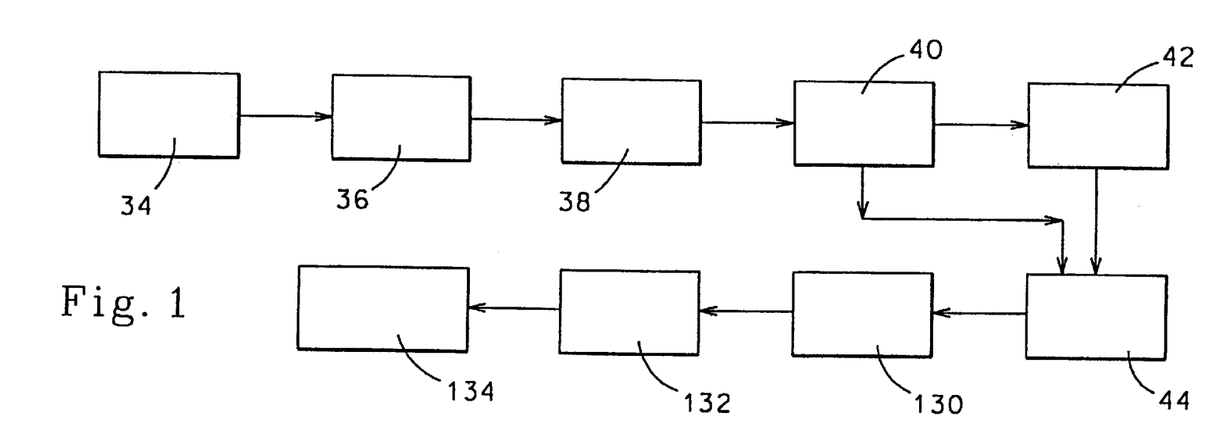
FIG. 1 is a schematic flow chart of a process used in manufacturing the door skin of the invention.
Figure 3:
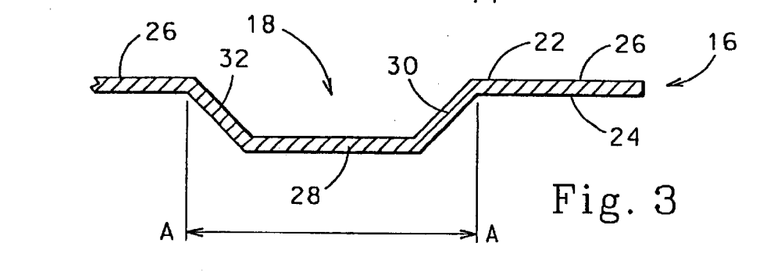
FIG. 3 is a fragmentary cross sectional view of the molded skin of the invention.

Flat blank 10 is transformed into a molded skin 16, as best shown in FIG. 3, through the process illustrated in FIG. 1. FIG. 3 illustrates the design element 18 which is formed in the skin, in order to provide the aesthetic appearance of, for example, the skin used with the door 20 of FIG. 7. The skin 16 of FIG. 3 has opposed surfaces 22 and 24, formed from the surfaces 12 and 14 of the blank 10. The skin 16 has parallel first portion 26 and second portion 28. The second portion 28 is integral with planar first portion 26 through offset portions 30 and 32. The offset portions 30 and 32 preferably have a configuration facilitating removal of the skin 16 from the platens of the press upon conclusion of the forming process. The portions 26, 28, 30 and 32 have different thicknesses due to the stretching process forming skin 16. For example, with a blank 10 having a thickness of 4 mm, then the first portion 26, forming part of the skin major surface, and the second portion 28 may have a thickness of slightly less than 4 mm, and the offset portions 30, 32 a thickness of about 3 mm due to the compression resulting from the stretching performed upon the blank 10 in order to create the design element 18. The amount of compression achieved however is directly proportional to the initial density, for example with a material having a density of 600 kg/m$^3$ the amount of compression could be as high as 25% but with a higher density material, say 800 kg/m$^3$, the amount could be as low as 5 to 10%.

Flush blank 10 is received at loading station 32 of FIG. 1. The blank 10 has a density of about 750 to about 800 Kg/m$^3$, and a thickness of from about 3 mm to about 7 mm. The blank 10 has an initial moisture content of about 8% by weight.

Blank 10 is then forwarded to a sealing station 36, where a liquid or foam sealant is applied by roll coating, spraying, or curtain coating. The sealant is applied in solution with a solid to fluid ratio of 2/3:1 and at a dry weight of about 2 to about 3 gm/ft$^2$. The sealant is applied only to what is to be the exterior surface of the skin 16 resulting from the blank 10, so that the wood fiber of opposite surface 22 is available to accept the polyvinyl acetate (PVA) used for adhesively securing the skin 16 to the door frame. The sealer may be dried at 38, such as with an infrared lamp. The sealant applied to the surface 14 may contain a colorant, such as when the door 20 is suitable for staining. Numerous sealers are known in the art. Preferably the sealer is an impress sealer, such as available from Akzo Noble. The sealer helps to clean the mold, aids in elasticity of the wood fiber, and improves the definition of the surface features.

From drier 38, the blank 10 is then preferably and optionally transferred to steam vessel 40. The blank 10 is exposed to a low pressure saturated steam within vessel 40. While in the vessel 40, the temperature of the blank 10 increases, and the blank 10 also absorbs moisture so that it exits the vessel 40 with a moisture content of about 15 to about 20% by weight. As noted previously, the resins binding the wood composite and wood fibers of the blank 10 are thermal setting resins, and the temperature increase in the vessel 10 begins the process of remelting the resin and thereby causing the blank 10 to become relatively soft.

I have also found that increasing the moisture content in the vessel 40 may be facilitated by sanding the blank 10 on both surfaces before starting the process. Sanding the surfaces appears to remove the resin located at the surface, so that moisture absorption is increased. Those skilled in the art recognize that wood fibers swell as moisture is absorbed, so the steam applied in vessel 40 serves the purpose of expanding the wood fibers, so that same may thereafter be stretched during the forming process, and also melting the resin in order to soften the blank 10.

I have found that low pressure steam should be used in the vessel 40. Moreover, care must be taken in how long the blank 10 is exposed to the steam. Should the blank be exposed to the steam for less than 30 seconds, then there may not be sufficient moisture absorption for wood fiber swelling, nor sufficient heat for resin softening. Should the blank 10 be exposed to the steam for too long, such as for more than one minute, then I have found that the surfaces 12 and 14 of the blank 10 tend to become blistered and discolored. Should the surface be blistered or discolored, then the resulting skin may not be suitable for a commercially acceptable door skin, or may require further processing.

Although I prefer that the blank 10 be exposed to moisture in the form of steam, those skilled in the art will recognize that other processes may be utilized. For example, mists of water may be sprayed onto the surfaces of the blank 10, followed by microwave or infrared heating. Regardless of how applied, moisture absorption is desirable in order to facilitate wood fiber swelling. As elsewhere explained, moisture absorption may not be necessary in certain instances, where longer press times are available. With steam vessel 40 and a 4 mm thick blank 10 of MDF, the cycle time may be so quick as 40 seconds.

From steam vessel 40, the blank 10 may be transported to barrier station 42, at which a moisture impervious barrier is applied to exterior surface 14 over the sealer. The moisture impervious barrier need only be applied for those skins intended for exterior applications. Its use gives an improved finish and it can therefore be employed to advantage for internal applications where superior appearance is desired. I prefer that the moisture impervious barrier be either a melamine impregnated crepe paper or a phenolic resin crepe paper applied over the sealer. A suitable paper may be purchased from Akzo Nobel under their name SWEDOTEC® flexible primer films TGPN and TXP. I prefer the use of a crepe paper substrate for applying the resin, because crepe paper has an expansion factor sufficient to accommodate the expansion which occurs when the design element 18 is formed. The crepe paper therefore will not rip, tear, or otherwise provide an interrupted surface through which moisture could migrate. Those skilled in the art will recognize that the cross linking polymeric resin system forming the moisture barrier may alternatively be applied as a two component liquid, sprayed or otherwise applied to the surface 14. Other sorts of moisture barriers are also useful.

A further advantage of the crepe paper barrier is that same may be colored, such as to permit a wood grain or other pattern or ornamention to be applied to the resulting surface 24. The moisture impervious barrier also adds hardness to the skin, and provides abrasion resistance. Improved abrasion resistance is helpful during shipping, where the skins and doors may become scratched or otherwise marred. The resin takes about 40 seconds to cure, and seals the face of the skin. The stretched portion of the blank 10 forming the design element 18 is susceptible to swelling, so the moisture barrier reduces that possibility.

Figure 4:
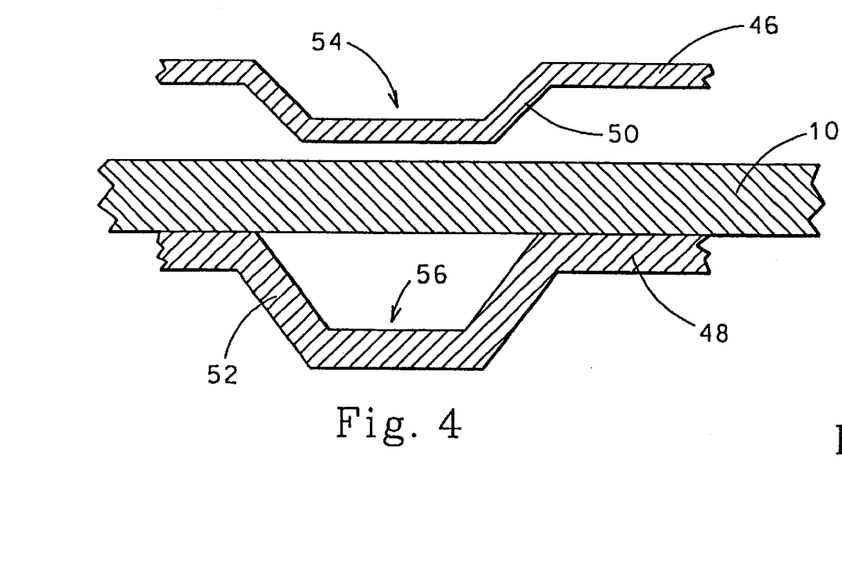
FIG. 4 is a fragmentary cross sectional view of the blank of FIG. 2 between the platens of the press used with the invention.

The blank 10 then is transferred to press 44, in which the configuration of FIG. 3 is impressed. I prefer that the press be a high pressure press of about 2,500 tons, in order to apply as much as 1.2 tons per square inch pressure to the blank 10 during the pressing operation. The press 44 has platens 46 and 48, as best shown in FIG. 4. The platens 46 and 48 are each preferably a chrome plated steel die, preferably a hard chrome plating having a 70 Rockwell hardness. I prefer that the surfaces 50 and 52 of the platens 46 and 48 have the hard chrome plating, in order to resist accumulation of wood sugars which otherwise might occur.

Each of the platens 46 and 48 preferably has a thickness of about 4 inches, and each of the platens 46 and 48 is heated. I prefer that the platens 46 and 48 be electrically heated, such as by a Kalrod, although oil circulation or steam circulation may be acceptable heat media. However heated, I prefer that the platens be maintained at a relatively high temperature of between about 320° F. and 425°, and more preferably between 370° F. and 380° F. The high temperature should be maintained throughout the pressing operation, which takes about 60 seconds with preconditioning and about 4 minutes without, in order to assure that the binding resin in the blank 10 remelts and remains flowable during the pressing operation.

The platen 46 has a male die element 54, with the platen 48 having a female die element 56. Preferably the die elements 54 and 56 are mirror images, in order to prevent the formation of thickness variations in the resulting skin. The press 44 causes that portion of the blank 10 forming the design element 18 to be expanded or stretched, so thickness variations, as could arise if the die elements 54 and 56 were not mirror images, could result in non-uniform flowing of the softened wood composite material. While FIG. 4 discloses only simple die elements 54 and 56, those skilled in the art will recognize that the molded door of FIG. 7 will require die elements with multiple apertures, the exact number and shape being dependent upon the configuration, size, and appearance of the door. The process through use of different die elements is suitable for manufacture of all currently known door designs.

I have found that the blank 10 may be transformed into a commercially acceptable molded skin 16 through softening the blank 10 initially in the steam vessel 40, and thereafter pressing the blank 10 between the platens 46 and 48 in response to a cyclic increasing pressure regimen. Moreover, I have found that an acceptable molded skin 16 may is be formed when the press 40 has means permitting degassing of the blank 10 in order to remove air, steam, vapor, and other volatiles, which otherwise could blister the surfaces of the skin. Degassing may be achieved by releasing the pressure, as is shown in the FIG. 5 graph, or by providing vents in the platens, as is shown in the FIG. 6 graph. Regardless of how the degassing is accomplished, I have found that an acceptable molded skin 16 may be formed where the pressure is cyclically applied at ever increasing levels, in order to cause the wood fiber and resin to flow until the desired configuration is achieved while also providing a means to remove gases.

Figure 5:
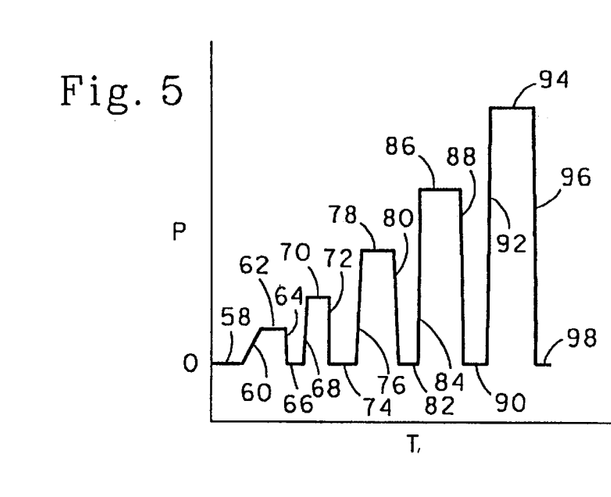
FIG. 5 is a graph illustrating pressure versus time in a first cycle according to one embodiment of the invention.

FIG. 5 discloses pressure versus time for a press 40 in which pressure in the platens 46 and 48 is cyclically released in order to degas the blank 10. As best shown in FIG. 5, the blank 10 is placed between the platens 46 and 48, such as shown in FIG. 4, in the region 58. The pressure is then relatively slowly increased at 60 to a first predetermined pressure. Once the first predetermined pressure is achieved, then it is maintained at 62 for a period of time sufficient to further heat the resin and to cause the wood fibers and resin to begin to flow. The pressure within platens 46 and 48 is then released at 64, and the blank 10 degassed from there through 66. The pressure is then increased at 68, and maintained at 70. The pressure maintained at 70 is higher than the pressure maintained at 62. The rate of increase of the pressure at 68 is much quicker than the relatively slow increase at 60, because I have found that an initial relatively low rate of pressure increase causes less stress to be applied to the wood fibers and the resin. They move more slowly, in view of their relatively hard and expanded condition. Once the initial configuration of the skin 16 is achieved through pressure application at 62, then the subsequent cycles serve the purpose of sharpening the definition of the design element 18 while also smoothing the surface 24 by allowing resin to accumulate at the surface.

After the pressure has been maintained at 70, then the pressure is again released at 72, in order to permit degassing to occur to 74. The pressure is increased at 76, maintained at 72 at a level higher than at 70, and then relieved at 80 in order to permit degassing at 82. The pressure is then rapidly applied at 84, maintained at 86, and then relieved at 88. Degassing occurs at 90, followed by pressure application at 92, pressure maintenance at 94, and pressure release at 96. The skin 16 may then be removed from the mold at 98.

I have found that the pressures 70, 78, 86, and 94 should each be higher than the peak pressure achieved in the immediately precedent cycle. Peak pressure at 94 may be 1.2 tons per square inch, which is a relatively high pressure. I have also found that the end maintenance periods 86 and 94 should be longer than the previous cycles 62, 70, and 78, in order to provide better definition to the design element 18.

I prefer that there be between 3 and 6 pressure cycles, of ever increasing peak pressure. The ever increasing peak pressures, in combination with maintaining platens 46 and 48 at the elevated temperatures, cause the wood fibers to change their state to form the contour of design element 18, cause the blank 10 to remain relatively soft, and improve the surface finish of the surface 24, so that same is commercially acceptable and suitable for painting, staining, or other ornamentation.

I have found that the number of pressure cycles and the degree to which the platens 46 and 48 close will vary, depending upon the thickness of the blank 10 and the material from which it is made. The pressure may be controlled by either regulating the spacing between the platens 46 and 48, or by regulating the pressure applied to the platens for closing them. Typically, only one of the platens 46 and 48 will be moveable relative to the other, so control over the hydraulic pressure, applied to the movable platen is effective for controlling the pressure cycle.

As noted earlier, although I prefer that the blank 10 be moistened in steam vessel 40 in order to soften the resin and swell the wood fibers, same is not necessary if the press cycle is sufficiently long. In that event, the blank 10 will be dry when placed into the press 44, with a moisture content of about 8%. Because the platens 46 and 48 are heated, then they provide sufficient heat through radiation to soften the resin and thereby the blank 10. Although the wood fibers in the blank 10 will not swell and thereby have additional enhanced flowability, a relatively long press cycle will minimize impacts in that regard.

Figure 6:
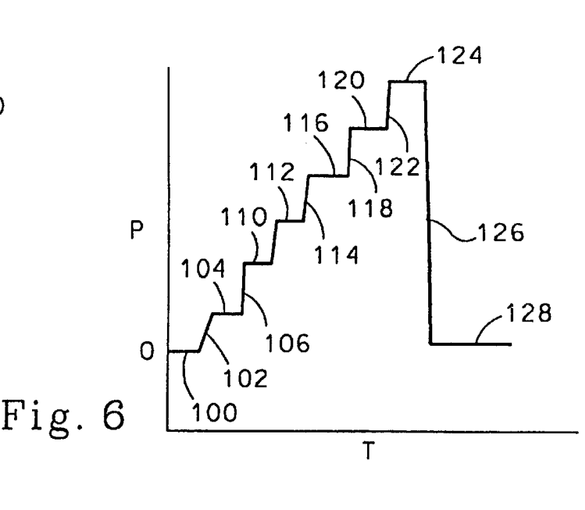
FIG. 6 is a graph illustrating pressure versus time for a second cycle according to the invention.

FIG. 6 discloses a pressure versus time cycle where the platens 46 and 48 have vents therethrough for permitting degassing to occur. Thus there is no need to release the pressure, but I have found that there continues to be a need for ever increasing peak pressure and a need to maintain those peak pressures.

The blank 10 is placed into the mold at 100, and the pressure slowly increased at 102. The pressure is maintained at 104, and then increased at 106. It should be recognized that with vented platens 46 and 48, degassing occurs substantially continuously throughout the pressing cycle. The pressure is maintained at 108 and then increased at 110. The pressure is then increased at 114, and maintained at 116. The pressure is increased at 118, and maintained at 112. The pressure is increased at 122, maintained at 124, and then reduced at 126 in order to permit the blank 16 to be removed at 128.

I have found that completion of the pressing cycles of FIGS. 5 and 6 causes the skin 16 to have an as removed moisture content of about 3% to about 4% by weight. Thus, because of the heat applied by the platens 46 and 48, the moisture content of the blank 10 is substantially reduced during the formation process. It could be lowered even further by increasing the press time. Additionally, the resultant finished skin 16 has a density of about 800 to about 1,000 Kg/m$^3$, higher than the density of blank 10. The increased density makes the skin 16 harder, thus improving the strength of the resulting door. Additionally, the increased density provides a better surface for painting. This increased density is attributable to the pressing applied to the blank 10 by the platens 46 and 48.

Formation of the design element 18 causes that portion of the blank 10 forming the design element 18 to be expanded or stretched by about 15% to about 25% by length, as shown in FIG. 3 by the arrows A—A. Moreover, the portion 28 of design element 18 has a reduced thickness on the order of about 25%, due to the need to provide wood fiber for the increased length.

Figure 7:
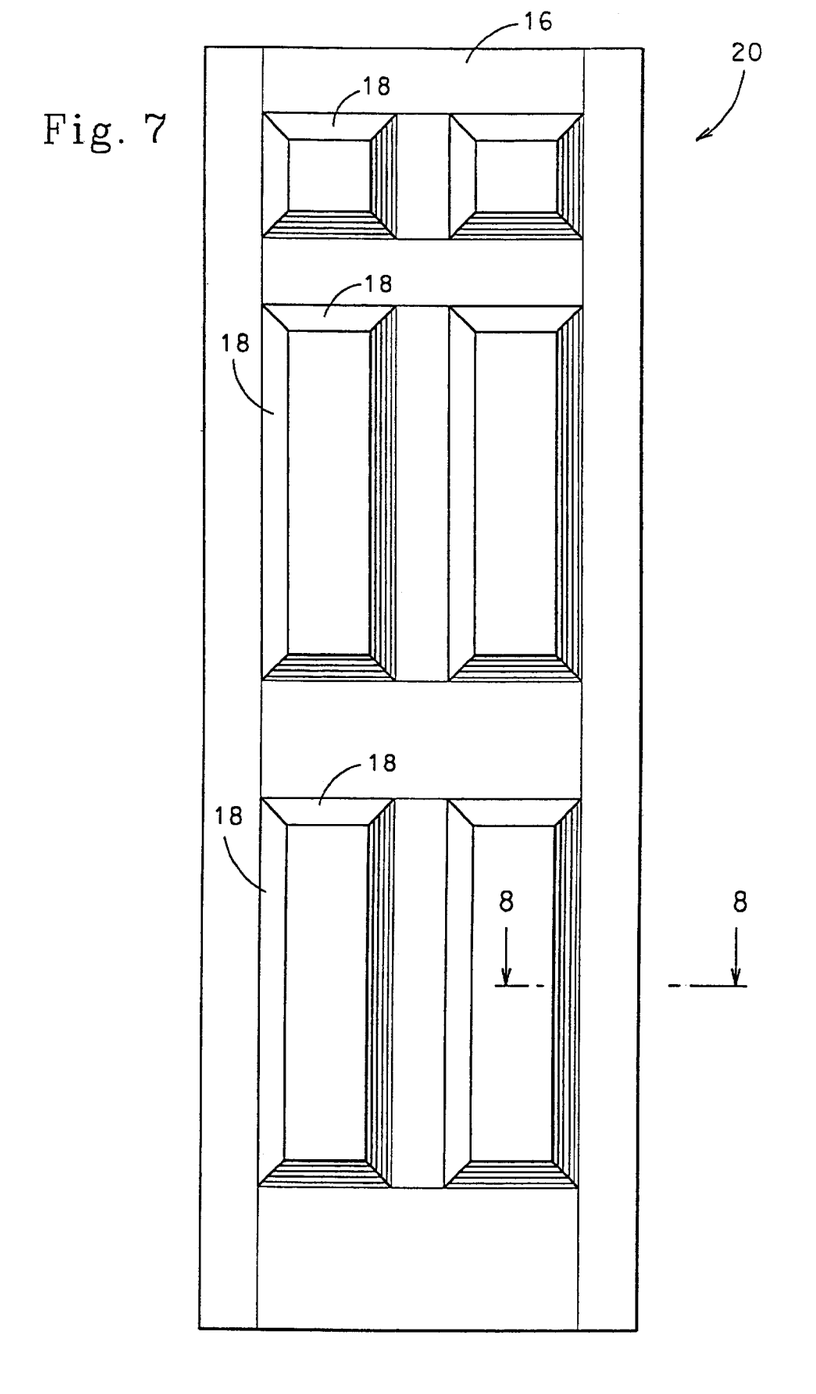
FIG. 7 is an elevational view of a molded door according to the invention.

Once the skin 16 has been removed from the press at 98 or 128, then it is forwarded to the reconditioning station 130 at which the skin 16 is remoistened to a moisture content of about 8%. Trimming and primming may be performed after remoisturising. Priming is not necessary if the crepe paper barrier is used. The remoistening may be achieved by water mists or the like or passing the skin across a water bath. A wetting agent may be added to the water to improve the rate of absorption. Once reconditioned, then the skin is transferred to door forming station 132, at which each skin is adhesively secured to a door frame, preferably a wooden frame, in order to form a door. FIG. 7 discloses an exemplary door. Should the door 20 of FIG. 7 be an exterior door, then a further moisture impervious barrier may be applied to the exposed edges of the frame at 134 by edge banding or painting.

Figure 8:
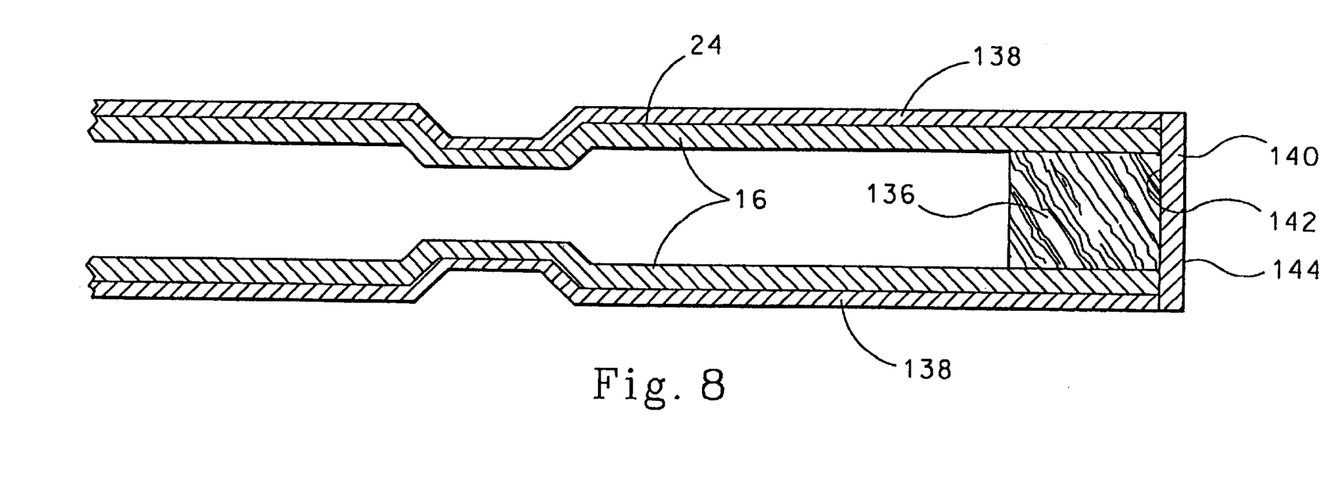
FIG. 8 is a fragmentary cross sectional view taken along the line 8—8 of FIG. 7.

FIG. 8 discloses a fragmentary cross sectional view of an exterior door pursuant to the invention, having molded door skins 16 adhesively secured to frame 136, such as with PVA. Those skilled in the art will recognize that the frame 136 extends about the periphery of the rectangular skins 16, and typically will comprise two wooden stiles extending along the longitudinal edges and two wooden rails extending horizontally and vertically. Additionally, while I disclose that the skins 16 are spaced apart, they may have a core, such as provided by foam disposed between them.

Melamine impregnated crepe paper or phenolic resin crepe paper 138 is disposed wholly about the exterior surface 24 of the outer most skin 16. As noted previously, the melamine impregnated or phenolic resin crepe paper 138 provides a moisture impervious barrier minimizing water absorption by the door 20. Other cross linkable moisture barriers may of course be used with the invention. In order to further increase the moisture resistance of the door 20 of FIG. 7, then an additional moisture impervious barrier 140 may be applied to the exposed edges 142 of the frame 136 and the edges 144 of the skins 16. This further barrier 140 may also be a melamine impregnated or phenolic resin crepe paper. I have found that the crepe paper is so thin, that same may overlap the layers 138 without imparting an undesirable appearance to the surface. The barrier 140 must also be cross linked, and this may occur by infrared heating or the like. The barriers 138 and 140, and the surface 24 having no barrier, are suitable for painting, staining, or other ornamentation.

While this invention has been described as having a preferred-design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

What I claim is:

1. A method of manufacturing a door skin, comprising the steps of:
    a) providing a wood composite flat blank at a first location spaced from a heated press having platens;
    b) moving the blank from said first location to a second location between the platens of the heated press, the platens being heated to a temperature sufficient to soften a resin in the blank;
    c) applying sufficient pressure to close the platens and thereafter applying the pressure at increasing pressure levels while degassing the blank and thereby causing the blank to be deformed into a molded shape determined by the configuration of the platens, and
    d) removing the molded blank from between the platens.

2. The method of claim 1, wherein:
    a) said application of increasing pressure levels includes an initial application of pressure at a first predetermined rate of increase and a subsequent application of pressure at a second predetermined rate of increase that is greater than the first predetermined rate of increase.

3. The method of claim 1, wherein:
    a) each of the platens includes at least one die element for determining the molded shape of the blank being deformed.

4. The method of claim 3, including the step of:
    a) reducing a thickness of at least one portion of the blank by at least about 5%.

5. The method of claim 4, wherein:
    a) the at least one portion of the blank is reduced in thickness by no greater than about 25%.

6. The method of claim 5, including the step of:
    a) maintaining application of pressure to the platens at level of up to about 1.2 tons per square inch.

7. The method of claim 3, including the step of:
    a) increasing a moisture content of the blank to a preselected content prior to placing the blank between the platens.

8. The method of claim 1, including the step of:
    a) selecting as the blank a wood composite flat blank having a density before placement of the blank between the platens of less than about 800 kg/m$^3$.

9. The method of claim 1, including the step of:
a) selecting as the blank a wood composite flat blank having a density before placement of the blank between the platens of greater than about 600 kg/m³.

10. The method of claim 8, wherein:
a) the blank has a density after removal of the blank from between the platens of no greater than 1,000 kg/m³.

11. The method of claim 8, wherein:
a) the blank has a density after removal of the blank from between the platens of greater than 800 kg/m³.

12. The method of claim 3, including the step of:
a) stretching a first portion of the blank by at least about 15% by length, as measured along a first major surface of the blank.

13. The method of claim 12, wherein:
a) the first portion is stretched by no more than about 25% by length, as measured along the first major surface.

14. The method of claim 1, including the step of:
a) increasing a moisture content of the flat blank to a pre-selected content prior to placing the blank between the platens.

15. The method of claim 14, including the step of:
a) exposing the blank to low pressure steam in order to increase the moisture content.

16. The method of claim 15, including the step of:
a) exposing the flat blank to saturated steam for a period sufficient to increase the moisture content to at least about 15% by weight.

17. The method of claim 16, including the step of:
a) decreasing the moisture content of the flat blank after placing the blank between the platens to a level of no more than about 4% by weight.

18. The method of claim 14, including the step of:
a) maintaining the platens at a temperature of at least about 320° F.

19. The method of claim 18, including the step of:
a) maintaining the platens at a temperature of no greater than about 425° F.

20. The method of claim 15, including the step of:
a) applying a sealer to a first major surface of the flat blank prior to increasing the moisture content.

21. The method of claim 20, wherein: a) the sealer is colored.

22. The method of claim 20, including the step of:
a) drying the sealer prior to increasing the moisture content.

23. The method of claim 1, including the step of:
a) applying a moisture barrier to a first major surface of the flat blank prior to placing the blank between the platens.

24. The method of claim 23, wherein:
a) the moisture barrier is cross linkable.

25. The method of claim 24, wherein:
a) the cross linkable moisture barrier is impregnated with one of a melamine resin and a phenolic resin.

26. The method of claim 1, wherein:
a) the flat blank is self-supporting.

27. The method of claim 1 wherein said wood composite flat blank comprises a wood composite flush door skin.

28. A method of manufacturing a door skin, comprising the steps of:
a) providing a wood composite flat blank at a first location spaced from a heated press having platens;
b) moving the blank from said first location to a position between the platens of the heated press, the platens being heated to a temperature sufficient to soften a resin in the blank and to thereby soften the blank;
c) closing the platens;
d) applying pressure to the platens, thereby causing the blank to be deformed into a molded shape determined by a configuration of the platens;
e) degassing the blank; and
f) removing the molded blank from between the platens.

29. The method of claim 28, wherein:
a) the flat blank is self-supporting.

30. The method of claim 29, wherein:
a) each of the platens includes at least one die element for determining the molded shape of the blank being deformed; and
b) at least first portion of a first major surface of the molded blank is non-planar.

31. The method of claim 28, including the step of:
a) increasing a moisture content of the flat blank to a preselected content prior to placing the blank between the platens.

32. The method of claim 31, including the step of:
a) exposing the flat blank to low pressure steam in order to increase the moisture content.

33. The method of claim 32, wherein:
a) the low pressure steam is saturated steam and the moisture content is increased to at least about 15% by weight.

34. The method of claim 33, wherein:
a) the moisture content of the flat blank is increased to content of no more than about 20% by weight.

35. The method of claim 31, including the step of:
a) maintaining the platens at a temperature of at least about 320° F.

36. The method of claim 35, including the step of:
a) maintaining the platens at a temperature of no more than about 425° F.

37. The method of claim 28, including the step of:
a) applying a sealer to a first major surface of the flat blank prior to increasing the moisture content.

38. The method of claim 37, wherein: a) the sealer is colored.

39. The method of claim 37, including the step of:
a) drying the sealer prior to increasing the moisture content.

40. The method of claim 28, including the step of:
a) applying a moisture barrier to a first major surface of the flat blank prior to placing the blank between the platens.

41. The method of claim 40, wherein: a) the moisture barrier is cross linkable.

42. The method of claim 41, wherein:
a) the moisture barrier is impregnated with one of a melamine resin and a phenolic resin.

43. The method of claim 40, including the step of:
a) providing as the moisture barrier, a melamine or phenolic resin system.

44. The method of claim 28, wherein:
a) the blank contains volatile components other than moisture that are degassed out of the press during said application of pressure to the platens.

45. The method of claim 28, wherein:
a) said degassing is performed during said application of pressure to the platens.

46. The method of claim 45, wherein:

a) each of the platens has at least one vent through which said degassing occurs.

47. The method of claim 46, wherein a) the flat blank is self-supporting.

48. The method of claim 47, wherein:

a) each of the platens includes at least one die element for determining the molded shape of the blank being deformed; and b) at least first portion of a first major surface of the molded blank is non-planar.

49. The method of claim 48, wherein:

a) at least one portion of a first major surface of the molded blank is non-planar.

50. A method of transforming a wood composite flush doorskin into a wood composite molded door skin, comprising the steps of:

a) providing a wood composite flush door skin;

b) placing the flush door skin between the platens of a heated press, the platens being heated to a temperature sufficient to soften the resin in the flush door skin and thus soften the flush door skin;

c) applying sufficient pressure to close the platens and thereafter applying the pressure at increasing pressure levels while degassing the flush door skin, thereby causing the wood composite flush door skin to be deformed into a wood composite molded door skin determined by the configuration of the platens, and d) removing the molded door skin from between the platens.

51. The method of claim 50, wherein the step of placing the flush door skin between the platens of a heated press comprises the step of moving a flush door skin from a first position not between the platens of a heated press toward the heated press.

52. A method of manufacturing a door skin, comprising the steps of:

providing a solid, wood composite flat blank;

providing a heated press having first and second platens;

placing the blank between the platens of the heated press, the platens being heated to a temperature sufficient to soften a resin in the blank and to thereby soften the blank;

closing the platens;

applying pressure to the platens, thereby causing the blank to be deformed into a molded shape determined by a configuration of the platens;

degassing the blank; and removing the molded blank from between the platens.

* * * * *